United States Patent [19]
Varley et al.

[11] Patent Number: 6,122,595
[45] Date of Patent: *Sep. 19, 2000

[54] HYBRID GPS/INERTIALLY AIDED PLATFORM STABILIZATION SYSTEM

[75] Inventors: Robert F. Varley, Valkaria; John J. Maney, Palm Bay, both of Fla.

[73] Assignee: Harris Corporation, Melbourne, Fla.

[*] Notice: This patent is subject to a terminal disclaimer.

[21] Appl. No.: 09/334,738

[22] Filed: Jun. 17, 1999

Related U.S. Application Data

[63] Continuation of application No. 08/650,503, May 20, 1996, Pat. No. 5,948,044.

[51] Int. Cl.$^7$ .................................................. G01C 21/00
[52] U.S. Cl. ........................ 701/220; 701/213; 701/215; 701/221; 342/359; 342/357.01; 342/357.06
[58] Field of Search ..................................... 701/213, 214, 701/215, 220, 221; 342/450, 357.01, 375.02, 357.03, 357.06, 357.11, 359

[56] References Cited

U.S. PATENT DOCUMENTS

5,948,044  9/1999  Varley et al. ........................... 701/220

Primary Examiner—Tan Nguyen
Assistant Examiner—Yonel Beaulieu
Attorney, Agent, or Firm—Charles E. Wands

[57] ABSTRACT

A hybrid system for stabilizing the attitude of an instrument relative to a dynamic platform includes a plurality of (roll, pitch and yaw) inertial rate sensors, whose outputs are sampled at a rate sufficient to provide real time tracking of changes in orientation of the platform, and a global positioning system (GPS) receiver, whose precision platform attitude output is updated periodically, but at a rate less than the rate of change of attitude of the platform. The inertial rate sensors provide effectively continuous motion (e.g., angular rate) data signals representative of three-dimensional changes in attitude (position derivative signals) of the platform. The inertial rate output are integrated to provide output signals representative of the dynamic orientation of the platform. Sequential outputs of the integration-processing circuitry are also coupled to a sample buffer, which is controllably read-out in accordance with the periodic updates from the GPS receiver. The integrated inertial sensor (attitude) data is compared with the GPS update data to generate error signals which are used to adjust the inertial sensor data. By employing a sample buffer in an inertial sensor output integration feedback loop with the GPS receiver, the hybrid system of the present invention avoids what would otherwise be a staleness problem with the data provided by the GPS receiver.

10 Claims, 4 Drawing Sheets

HYBRID GPS/INERTIALLY AIDED PLATFORM STABILIZATION SYSTEM

This is a continuation of application Ser. No. 08/650,503, filed May 20, 1996, entitled "HYBRID GPS/INERTIALLY AIDED PLATFORM STABILIZATION SYSTEM", by Robert E. Varley and John J. Maney, now U.S. Pat. No. 5,948,044, issued Sep. 7, 1999.

FIELD OF THE INVENTION

The present invention relates in general to systems for stably positioning an instrument, such as an antenna, relative to a dynamic platform, such as a ship, upon which the instrument is mounted, and is particularly directed to the combination of a global positioning system (GPS) receiver and inertial rate sensors to achieve GPS receiver accuracy having an effectively real time update rate.

BACKGROUND OF THE INVENTION

Unlike a fixed or stationary site, a mobile communication terminal, such as a communication antenna that is to be pointed at a satellite, and which is mounted on a moving vehicle, such as a truck or ship, must operate in either a static or dynamic mode. In order to acquire and point at the satellite, a mobile communication terminal requires a reference for stabilizing the orientation of the antenna line of sight (LOS), and comparing it with the LOS coordinates to the satellite. Usually, a 'platform reference' device is employed to measure the orientation of the mobile platform relative to gravity (normal to the earth) and geographic north, and encoders are used to measure the antenna gimbal angles relative to the platform. Included among the various types of sensor devices that may be employed for this purpose are global positioning system (GPS) receivers, inertial rate sensors, North-seeker type devices, flux-gate magnetic compasses, and gravity-referenced inclinometers, and ring laser and fiber optic gyrocompass mechanisms. As will be discussed below, each of these conventional devices has its own set of advantages and disadvantages.

A global positioning system (GPS) receiver has an accurate heading and tilt (e.g., down to 0.3 deg RMS), works on a rapidly moving platform, is immune to magnetic effects, and is low power and ruggedized, Moreover, its cost is only moderate. Among its disadvantages are the fact that it requires two meter antenna separation for full accuracy, has some RF blockage, has a low (1 Hz) update rate (with up to once second attitude output staleness), and provides attitude outputs only.

An inertial rate sensor (e.g., piezoelectric or quartz tuning fork, fluid rotor, gas flow type) has the ability to provide real-time analog rate outputs. In addition, it is a relatively inexpensive component (less than $1K per axis), works on a moving platform, and has high bandwidth. Also, it is effectively immune to magnetic effects, and is low power and ruggedized. However, it provides only rate outputs, which suffer long term drift.

A North-seeker type device, such as a mechanical, ring-laser or fiber-optic gyro, has an accurate heading (e.g, 0.1 deg RMS), typically provides tilt outputs (e.g., 0.02 deg RMS), and is ruggedized. However, it is expensive and is not well suited for a moving platform. In addition, it is massive and consumes considerable power.

A flux-gate magnetic compass is a low power, low cost device, that works on a moving platform, and is ruggedized. Unfortunately, it is affected by ferrous materials (calibration is lost if the magnetic environment changes), and it provides a heading output only, without tilt. It also suffers from poor accuracy (~0.5 deg at best), and its output is magnetic north, not true north.

Gravity-referenced inclinometers have accurate absolute tilt, are immune to magnetic effects, can be low cost, are ruggedized and low power. However, they are severely disturbed by motion, and provide tilt outputs only (no heading information).

A ring laser gyrocompass (RLG) or fiber optic gyrocompass (FOG) enjoys a highly accurate heading and tilt (e.g., down to 0.02 deg RMS), a high output update rate, and works on a rapidly moving platform. In addition, it is immune to magnetic effects, can provide rate outputs, and meets all military specifications. Unfortunately, such a gyrocompass system is massive (typically weighing fifty pounds), requires substantial electrical power to operate (e.g., 75 watts) typical, and is costly to manufacture.

Even though (RLG) or fiber-optic (FOG) gyrocompasses are expensive relative to the cost of communication equipment, they do provide the greatest accuracy for either static or dynamic platforms. As a consequence, they have replaced mechanical gyro systems in production, due to greater accuracy and much greater operating life. If the platform is static during operation, inclinometers can provide accurate, cost-effective tilt measurements. However, motion disturbs inclinometer outputs severely, since they cannot distinguish lateral accelerations from the desired gravitational acceleration. For dynamic platforms, various equipment suppliers integrate inertial rate sensors with inclinometers in order to provide cost-effective real-time dynamic tilt angles. However, low-cost azimuth sensors are limited to magnetic flux gate compasses, which provide about 0.5 deg accuracy relative to magnetic north.

This uncertainty of magnetic north to true north provides a further complication. If greater north accuracy is needed, for static applications, 'north seekers' are available. These commonly provide both azimuth and tilt outputs. However, they cost almost as much as a complete FOG or RLG gyrocompass, but provide limited dynamics and less north accuracy. The GPS receiver provides almost as good accuracy for a much lower cost. The north seekers also lose accuracy at high latitudes, unlike the GPS receiver.

For static applications, which typically require better than 0.5 deg north error (but not better than 0.15 deg), the GPS receiver is the most cost-effective solution. However, for dynamic platforms with great than about 0.1 deg/sec rotation, the 1 Hz update rate and up to 1 sec delay in the GPS output may lead to excessive errors.

SUMMARY OF THE INVENTION

In accordance with the present invention, the shortcomings of conventional instrument stabilizing devices are effectively obviated by means of a hybrid system of a plurality of (roll, pitch and yaw) inertial rate sensors, whose outputs are sampled at a rate sufficient to provide real time tracking of changes in orientation of the platform, on the one hand, and a global positioning system (GPS) receiver, on the other hand, whose precision platform attitude output is updated periodically, but at a rate that can be expected to be less than the rate of change of attitude of the platform. The inertial rate sensors provide effectively continuous motion (e.g., angular rate) data signals representative of three-dimensional changes in attitude (position derivative signals) of the platform.

These inertial rate output signals are digitized at a prescribed sampling rate and coupled to downstream integration-processing circuitry, which provides an output representative of the dynamic orientation of the platform. Sequential outputs of the integration-processing circuitry are also coupled to a sample buffer, which is controllably read-out in accordance with the periodic updates from the GPS receiver. The integrated inertial sensor (attitude) data is compared with the GPS update data to generate error signals which are used to adjust the inertial sensor data.

In effect by employing a sample buffer in an inertial sensor output integration feedback loop with the GPS receiver, the hybrid system of the present invention avoids what would otherwise be a staleness problem with the data provided by the GPS receiver. Namely, the data values output from the GPS receiver may be up to a second old or 'stale'. Because a typical platform might rotate through an angle of many (antenna) beamwidths in one second, it would be useless to simply track the relatively slow outputs of the GPS receiver as though they were up to date with the relatively faster change in orientation of the dynamic platform. The installation of sample buffer allows extrapolation from out of date GPS values.

The sample buffer handles the fact that the staleness of the data values is variable and irregular, and that the times when the data values were valid are usually on the order of one second apart. Also, buffering the data in the sample buffer allows the data values to be time-tagged in terms of GPS time (which has no inherent meaning to the digital signal processor). Without a GPS time reference, there is no known time interval.

The GPS receiver may comprise a diversity antenna-based multi-channel device, in which phases of multiple GPS satellite signals are compare to calculate the orientation of the platform up which diversity antennas are mounted, or it may comprise a plurality individual GPS receivers, the phase outputs of which are processed in an error estimation unit which directly estimates errors in stored attitude angle data based upon the phase data outputs provided by the respective GPS receivers, rather than initially calculating platform attitude.

A scale factor correction is provided by a correction estimation unit to make the motion amplitude sensed by the inertial rate (platform motion) sensors agree with the tilt angle amplitude observed by the GPS receiver. In addition, a bias correction removes any voltage offset from the output of the inertial rate sensors as well as any other cumulative errors in the integral output of the integrator. The bias correction nulls any DC bias in the rate sensor output or analog-to-digital (A/D) circuits in the attitude signal path, while a proportional term tracks out other cumulative errors and stabilizes the integration feedback loop.

Because they are designed for different purposes, the inertial angle rate sensors for the antenna platform provide (angular) rate measurements in a coordinate system attached to their cases or housings on the dynamic platform. The GPS receiver, however, provides attitude (roll, pitch and yaw) angle outputs in a gimbaled coordinate system referenced to the surface of the earth. In the antenna platform or body coordinate system, the nominal azimuth axis of a respective inertial sensor tilts along with its case. On the other hand three inertial rate measurement axes for roll, pitch and yaw are always mutually orthogonal to one another. Also, in the gimbaled coordinate system, the azimuth axis remains vertical, while the roll axis is tilted by the pitch angle, so that the azimuth and roll axes may be non-orthogonal. Consequently, in order to properly combine the outputs of the GPS receiver and the inertial rate sensors, it is necessary to reconcile the sensor data outputs originally derived in terms two respectively different coordinate systems.

Pursuant to a preferred embodiment of the invention, body/gimbaled and gimbaled/body coordinate system conversions are employed to account for this difference between the gimbaled angle outputs of the GPS receiver and the body rate outputs of the inertial rate sensors. The coordinate system conversion and related transforms include body-to-gimbaled rates, gimbaled-to-body rates, synchro angle-to-ideal roll and pitch angles, and a calibration routine to derive constants used in the ideal roll and pitch calculation. These transforms are required, since the inertial rate sensor outputs body rate representative signals, while the GPS attitude sensors produce gimbaled roll, pitch and heading angle representative signals.

DETAILED DESCRIPTION

Before describing in detail the particular improved hybrid GPS/inertially aided platform stabilization system in accordance with the present invention, it should be observed that the present invention resides primarily in a novel structural combination of commercially available position, orientation and rate sensing transducer components and associated signal and data processing circuits and supervisory control software, and not in the particular detailed configurations thereof. Non-limiting examples of commercially available position sensing transducer components which may be employed in the hybrid system of the present invention, to be described, the GPS receiver may comprise a TANS Vector II GPS attitude sensor manufactured by Trimble Navigation Ltd., Sunnyvale, Calif. Inertial sensors may include roll, pitch and heading sensors manufactured by Watson Industries Inc., Eau Claire, Wis. The digital data signal processor may comprise a commercially available computer unit, such as an Intel 80486- or Pentium-based processing system.

Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 1:
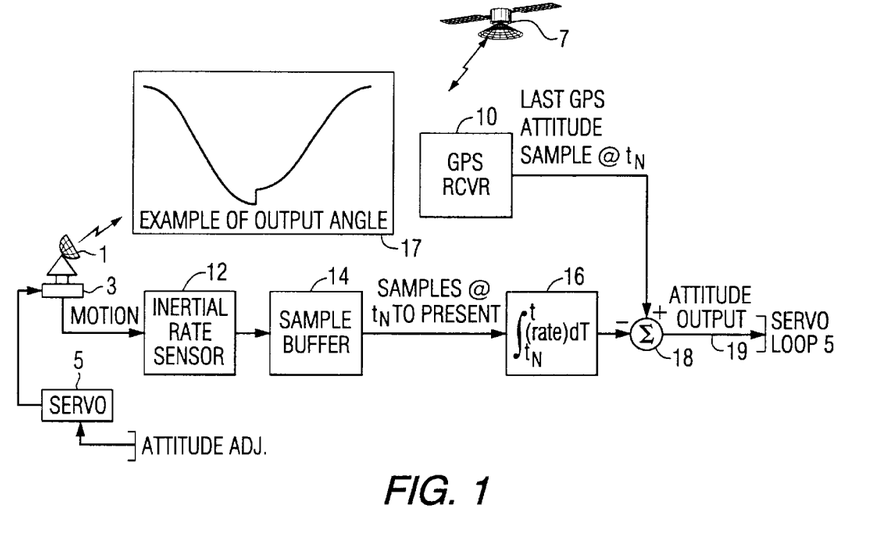
FIG. 1 is functional block diagram of a hybrid system embodying the principles of the present invention for stably positioning an instrument relative to a dynamic platform.

FIG. 1 is functional block diagram of a hybrid system embodying the principles of the present invention for stably positioning an instrument relative to a platform, the position and orientation of which that may be either static or dynamic. For purposes of providing a non-limiting example, the instrument is illustrated as a shipboard-mounted antenna 1, which is gimbal-mounted to a dynamic support platform (e.g., ship) 3. A motor-driven servo loop 5 provides for adjustment of the orientation or attitude of the antenna 1, relative to the platform 3, so that the antenna 1 remains pointed at a given object, such as a geosynchronous communications satellite 7. The hybrid system of the present invention serves to generate the attitude representative signals to which the servo loop 5 responds to stably maintain the antenna 1 pointed at the satellite 7, regardless of changes in the attitude (roll, pitch and yaw) of the ship.

As shown in FIG. 1, the hybrid system comprises a global positioning system (GPS) receiver 10 and one or more inertial rate sensors fixed to the instrument support structure, a single one of which is shown at 12 to simplify the illustration. GPS receiver 10 receives platform motion inputs and periodically generates precise attitude (roll, pitch and yaw) output data. The inertial rate sensors 12 provide effectively continuous motion (e.g., angular rate) data signals representative of three-dimensional changes in attitude (position derivative signals) of the platform. These inertial rate output signals are digitized at a prescribed sampling rate and coupled to downstream integration-processing circuitry, to be described, which provides an output representative of the dynamic orientation of the platform, to which the servo loop responds to adjust the position of the instrument. Sequential outputs of the integration-processing circuitry are also coupled to a sample buffer 14, which is driven by the periodic updates from the GPS receiver 10.

More particularly, as successive instrument motion data samples are derived from an inertial rate sensor 12 they are integrated into position data values, which are coupled to and stored in a sample buffer 14. For this purpose, successive inertial rate samples are applied to an integrator 16, which provides an output representative of the integral of the inertial rate sensor data over a prescribed time interval, in particular a time interval commencing with the time tN of the last output from the global positioning receiver 10 to the present (which may be on the order of one second). This integration value is combined at 18 with the last or most recent GPS attitude data value provided at time tN, to produce a 'corrected' platform attitude output signal on line 19 to a platform attitude control device employed by the servo loop 5, to adjust the attitude/orientation of the gimbal-mounted antenna 1 relative to the platform upon which it is mounted.

In the functional system diagram of FIG. 1, whenever a GPS receiver 10 provides a new update, integrator 16 may be restarted from the time tN of generation of the new update, using the inertial rate data stored in sample buffer 14. Sample buffer 14 is a key component in solving the above discussed problems of long and variable GPS output data staleness. Since successive storage locations in sample buffer 14 store output data from the associated inertial sensor which was valid at specific times prior to the present (during the last or immediately previous second), then whenever GPS receiver 10 outputs a new GPS update, the GPS data time stamp (output time tN) can be used to specify the inertial sensor output data that was valid at the same time as the GPS data. Time-matching these two data values effectively causes the inertial sensor output data to 'track' the GPS data at the same successive instants in time (sequential sample data points), regardless of the specific GPS sample delay. Because the integral can be updated as often as needed, and the integration time period can be as long as needed, the above-described problems of slow GPS update rate and high GPS data staleness (of up to one second) are obviated.

However, simple integration of the inertial data outputs is limited by the fact that any sample-to-sample errors in the output of the GPS receiver 10, and any sensor errors such as bias or a scale factor cause the inertial rate integral provided by integrator 16, between the times at which GPS output is periodically updated (typically on the order of once per second) to disagree slightly with the difference in these GPS outputs. This difference, if not corrected, would lead to a discontinuity in the inertial rate output signal, an illustrative example of which is diagrammatically illustrated at 17, whenever integrator 16 is restarted using the new update from the GPS receiver 10. For example, where the inertial sensor 12 provides an output representative of the rate of change of a rotational angle, the discontinuity caused by the GPS receiver output alone can be several tenths of a degree.

Figure 2:
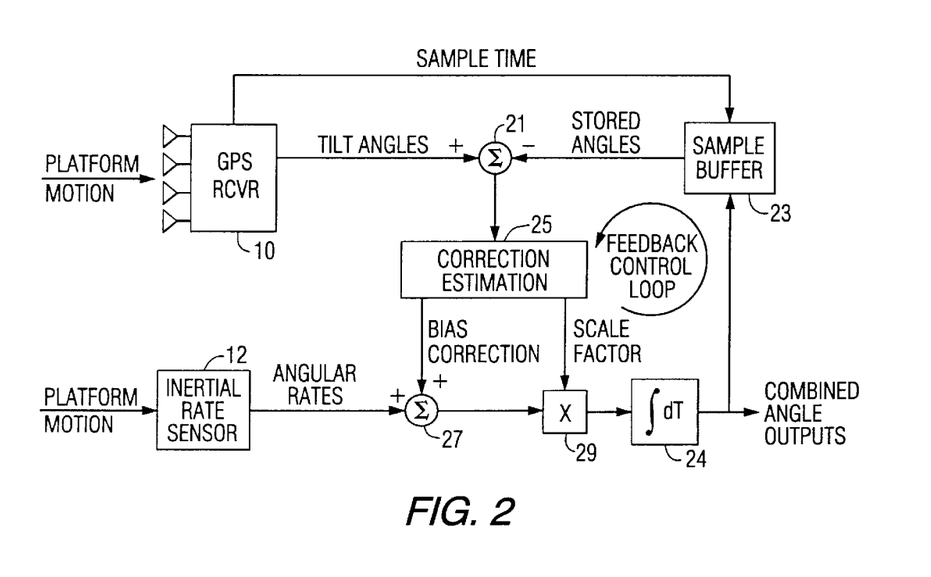
FIG. 2 shows a modified version of the hybrid system of FIG. 1, in which a feedback loop containing a sample buffer is employed to adjust inertial sensor outputs in accordance with periodically generated GPS receiver output data.

To avoid this problem of output discontinuities due to changing the starting value of the integration, and to reduce both GPS receiver and inertial rate sensor errors, the functional block diagram of FIG. 1 is modified in the manner shown in FIG. 2, so as to employ a continuous integral of the inertial sensor rate sensor output signals, using a feedback loop having a long time constant that makes the rate integral smoothly track the GPS receiver output on a long-term basis.

Figure 3:
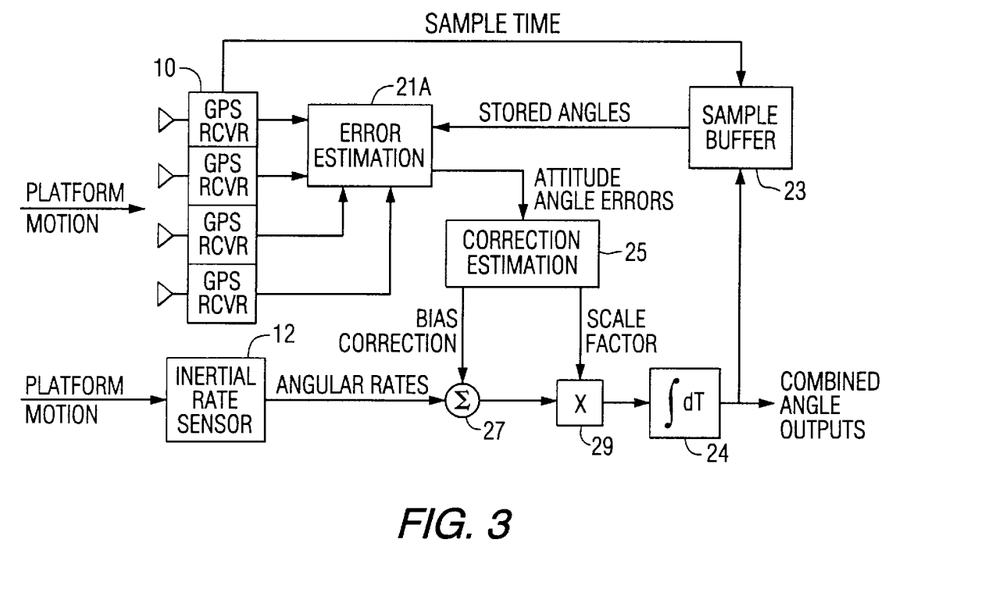
FIG. 3 shows a modified version of the hybrid system of FIG. 2 containing a plurality individual GPS receivers.

More particularly, in the modified hybrid system of FIG. 2, the output of GPS receiver 10 is coupled to as one input to a combining (subtraction) unit 21, a second input of which is derived from a sample buffer 23 of a feedback loop 15. GPS receiver 10 may comprise a diversity antenna-based multi-channel device, in which the internal processor compares phases of multiple GPS satellite signals to calculate the orientation of the platform up which diversity antennas are mounted, or, as diagrammatically illustrated in FIG. 3, it may comprise a plurality individual GPS receivers, the phase outputs of which are processed in an error estimation unit 21A, which directly estimates errors in stored attitude angle data based upon the phase data outputs provided by the respective GPS receivers, rather than initially calculating platform attitude.

Sample buffer 23 stores successive integration outputs of an integrator 24. The integration values are read out of sample buffer 24 in accordance with the GPS update time signals at successive update times tN. The combined data from combining unit 21 is subjected to a correction operation in correction estimation unit 25, which provides a bias correction output to a first input of a summation unit 27 and a scale factor output to a first input of a multiplier unit 29.

The scale factor correction provided by correction estimation unit 25 to multiplier 29 serves to make the motion amplitude sensed by the inertial rate (platform motion) sensors 12 agree with the tilt angle amplitude observed by GPS receiver 10. In addition, the bias correction supplied by correction estimation unit 25 to summation unit 27 is operative to remove any voltage offset from the output of the inertial rate sensor 12, as well as any other cumulative errors in the integral output of integrator 24. As will be described, the bias correction is operative nulls any DC bias in the rate sensor output (or analog-to-digital A/D circuits), while a proportional term tracks out other cumulative errors and stabilizes the integration feedback loop. Without the proportional term, the second order loop created by the bias correction and rate signals could become unstable.

Because they are designed for different purposes, the inertial angle rate sensors 12 for the antenna platform provide (angular) rate measurements in a coordinate system attached to their cases or housings on the dynamic platform. On the other hand, the GPS receiver 10 provides attitude (roll, pitch and yaw) angle outputs in a gimbaled coordinate system referenced to the surface of the earth. In the antenna platform or body coordinate system, the nominal azimuth axis of a respective inertial sensor 12 tilts along with its case; however, the three inertial rate measurement axes for roll, pitch and yaw are always mutually orthogonal to one another. Also, in the gimbaled coordinate system, the azimuth axis remains vertical, while the roll axis is tilted by the pitch angle, so that the azimuth and roll axes may be non-orthogonal. Consequently, in order to properly combine the outputs of the GPS receiver 10 and the inertial rate sensors 12, it is necessary to reconcile the sensor data outputs originally derived in terms two respectively different coordinate systems.

Figure 4:
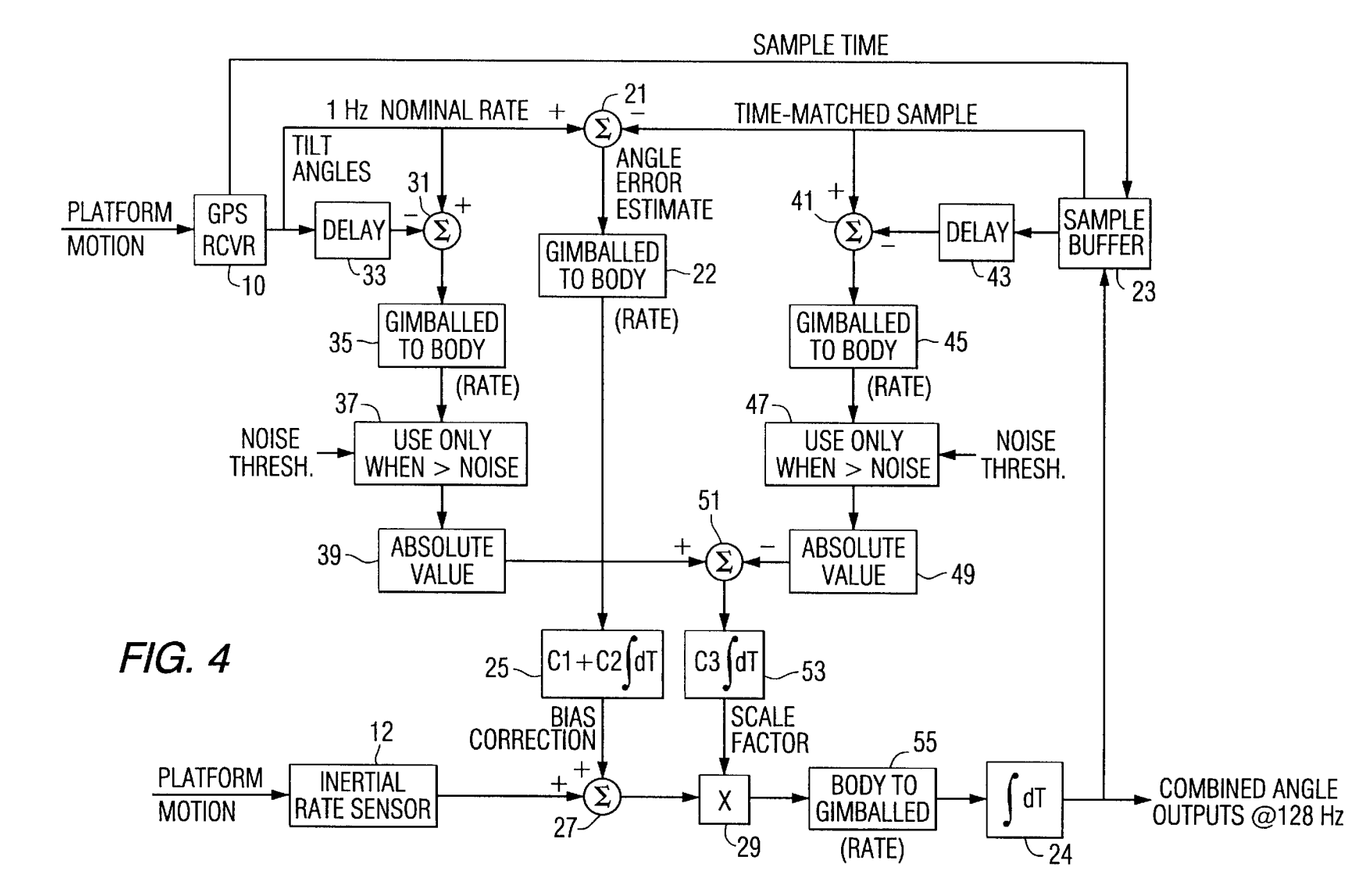
FIG. 4 diagrammatically illustrates a preferred embodiment of the invention.

Pursuant to a preferred embodiment of the invention, diagrammatically illustrated in FIG. 4, body/gimbaled and gimbaled/body coordinate system conversions are employed to account for this difference between the gimbaled angle outputs of the GPS receiver 10 and the body rate outputs of the inertial rate sensors 12. The coordinate system conversion and related transforms include body-to-gimbaled rates, gimbaled-to-body rates, synchro angle-to-ideal roll and pitch angles, and a calibration routine to derive constants used in the ideal roll and pitch calculation. These transforms are required, since the inertial rate sensor outputs body rate representative signals, while the GPS attitude sensor outputs gimbaled roll, pitch and heading angle representative signals. While these are exact transforms for rates, they are also reasonably accurate approximations for small angular differences, such as gimbaled angle errors. For this reason, gimbaled-to-body conversions to be described are used to convert GPS and combined angle differences to body coordinates for deriving corrections to the body rate measurements. Since these conversions depend on the dynamic attitude angles, they are recalculated at each iteration.

More particularly, in addition to being coupled to one input of a subtraction operator 21, the output of GPS receiver 10 is also coupled directly to a one input of a subtraction operator 31 and through a delay 33 to a second input of subtraction operator 31. Similarly, in addition to being coupled to a second input of subtraction operator 21, the read-outputs of the integration sample values stored in sample buffer 23 are coupled to one input of a subtraction operator 41, and through a delay 43 to a second input of subtraction operator 41.

The output of subtraction operator 21, representative of error angle estimation, is coupled to gimbal-to-body coordinate system converter 22, the coordinate conversion output of which is supplied to a bias correction integration operator 25 which sums a prescribed D.C. bias term with a proportional integral term and supplies the resultant value to one input of summation operator 27. The output of summation operator 27, which sums the bias correction with the output of the inertial rate sensor 12 and supplies the resultant total to a multiplier 29, which multiplies the bias corrected inertial rate value by a scale factor term, to be described. For the scale factor term, the outputs of subtraction operators 31 and 41 are differentially combined through a scale factor loop to correct for any scaling error in the inertial rate sensors, by making any changes in the rate integral match changes in the angle output of the GPS receiver 10.

For this purpose, in the inertial rate sensor scale factor path, the output of subtraction operator 31 is coupled to a gimbaled-to-body coordinate converter 35, the output of which is compared in a noise threshold comparator 37 with a prescribed noise reference value. Comparator 37 is operative to update the scale factor correction only in response when the angle changes are well above the sample-to-sample GPS noise. Otherwise, the loop will attempt to make the changes in the rate integral match the noise level of the GPS receiver outputs. To obviate this problem, the scale factor correction is updated only when comparator 37 determines that the difference in the rate integral output by subtraction operator 31 exceeds a prescribed threshold (e.g. on the order of 0.6 deg). This also ensures that GPS and rate integral changes have the same sign. The scale factor corrected data is then coupled to an absolute value operator 39, which derives the absolute value of the scale corrected value, since only the amplitude of the changes is relevant to the scale factor, not the sign. The output of absolute value operator 39 is coupled to one input of a scale factor difference operator 51.

Likewise, in the GPS receiver scale factor path, the output of subtraction operator 41 is coupled to a gimbaled-to-body coordinate converter 45, whose output is compared in a noise threshold comparator 47 with a prescribed noise reference value. Like comparator 37, in the inertial sensor path, comparator 47 is operative to update the scale factor correction only in response when the integral changes well above the sample-to-sample GPS noise, so that the scale factor correction is updated only when comparator 47 determines that the difference in the integral output by subtraction operator 41 exceeds the above reference threshold. The scale factor corrected data output by comparator 47 is coupled to an absolute value operator 49, which outputs the absolute value of the scale corrected value to a second input of a scale factor difference operator 51. The output of scale factor difference circuit is coupled to an integrator 53, which outputs a scale factor integration value to multiplier 29.

It may be noted that the scale factor loop is only a first order loop and does not require a proportional term, since the scale factor correction is not added into the rate integral as is the bias correction, as will be described. Since the bias and scale factor corrected inertial rate output of multiplier 29 is expressed in terms of body coordinates, it is converted back into gimbal coordinates by a body-to-gimbal converter 55, prior to be applied to integrator 24.

The gimbaled/body conversion transform operators of the hybrid system of FIG. 4 correspond to those described in a paper by J. Maney, dated Jun. 24, 1985, entitled: "Implementation of MK-19 Correction Using a Rate VRA." This paper describes that the angular momentum vector may be determined by expressing the change of the line-of-sight vector as the cross product of the line of sight and angular momentum vectors. Roll, pitch and heading are defined conventionally, such that when these terms are all zero, the heading axis is 'down', the pitch axis is 'east' and the roll axis is 'north'. The corresponding body rates are defined with the same nominal axes and senses, so that the body and gimbaled rates are equal when the roll, pitch and heading angles are zero.

In accordance with the coordinate conversion transforms, the following terms are employed:

UD=line of sight (LOS) vector in deck coordinates;
UT=line of sight (LOS) vector in topocentric coordinates;
R, P, H=gimbaled roll, pitch, and heading angles;
[R], [P], [H]=roll, pitch, heading rotation matrices;
[-R]=inverse roll rotation matrix;
[VX, VY, VZ]=body angular velocity vector;
when R=P=H=0,
the matrix [VX, VY, VZ]=[roll rate, pitch rate, heading rate].

$$UD = [R][P][H]UT$$

$$dUD = [R + dR][P][H]UT + [R][P + dP][H]UT + [R][P][H + dH]UT$$

$$= [R]\{[dR, 0, 0] \times [P][H]UT\} + [R][P]\{[0, dP, 0] \times [H]UT\} +$$

$$\{[R][P][H][0, 0, dH] \times UT\}$$

$$= [R] \times [R][P][H]UT + [R][P] \times [R][P][H]UT + [R][P][H] \times$$

-continued $$[R][P][H]UT$$

$$= \{[dR, 0, 0] + [R][0, dP, 0] + [R][P][0, 0, dH]\} \times [R][P][H]UT$$

$$= \{[dR, 0, 0] + [R]]0, dP, 0] + [R][P][0, 0, dH]\} \times UD$$

$$= \text{Angular Velocity Vector} \times UD = [VX, VY, VZ] \times UD.$$

Therefore, for the gimbal-to-body conversions of operators 22, 35 and 45:

$$[VX, VY, VZ] = [dR, 0, 0] + [R][0, dP, 0] + [R][P][0, 0, dH]$$
$$= [dR, 0, 0] + [R]\{[0, dP, 0] + [P][0, 0, dH]\}$$
$$= [dR, 0, 0] + [R]\{[0, dP, 0] + [dH\sin P, 0, dH\cos P]\}$$
$$= [dR, 0, 0] + [R][dH\sin P, 0, dH\cos P]\}; \text{ and}$$

$$[VX, VY, VZ] = [dR + dH\sin P], [dP\cos R - dH\cos P\sin R],$$
$$dH\cos P\cos R + dP\sin R].$$

For the body-to-gimbaled conversion of operator 55, $$[WX, WY, WZ] = [-R][VX, VY, VZ]$$
$$= [-R][Dr, 0, 0] + [dH\sin P, dP, dH\cos P]$$
$$= [dR + dH\sin P, dP, dH\cos P].$$

Therefore, dP=WY, dH=WZ/cosP and dR=WX−dHsinP.

As pointed out above, the signal processing architecture of the hybrid system of the present invention employs a sample buffer 14, to prevent what would otherwise be a staleness problem with the data provided by the GPS receiver 10. Namely, the data values output from the GPS receiver 10 may be up to a second old or 'stale'. Because a typical platform might rotate through an angle of many (antenna) beamwidths in one second, it would be useless to simply track the relatively slow outputs of the GPS receiver 10, as if they were up to date with the relatively faster movement of the dynamic platform. The installation of sample buffer 14 allows extrapolation from out of date GPS values.

The sample buffer 14 also handles the fact that the staleness of the data values is variable and irregular, and the fact that the times when the data values were valid are usually on the order of one second apart (typically within a range of from 0.5 to 1.5 seconds). Moreover, buffering the data in the sample buffer 14 allows the data values to be time-tagged in terms of GPS time, which has no inherent meaning to the digital signal processor executing the above described mathematical operations on the platform and inertial sensor data. Without a GPS time reference, there is no known time interval. In addition, the threshold-based scaler correction mechanism of the architecture of FIG. 4 removes the effects of the GPS receiver output values, which have several tenths of a degree of sample-to-sample noise, which would add directly to output error if not corrected.

Figure 5:
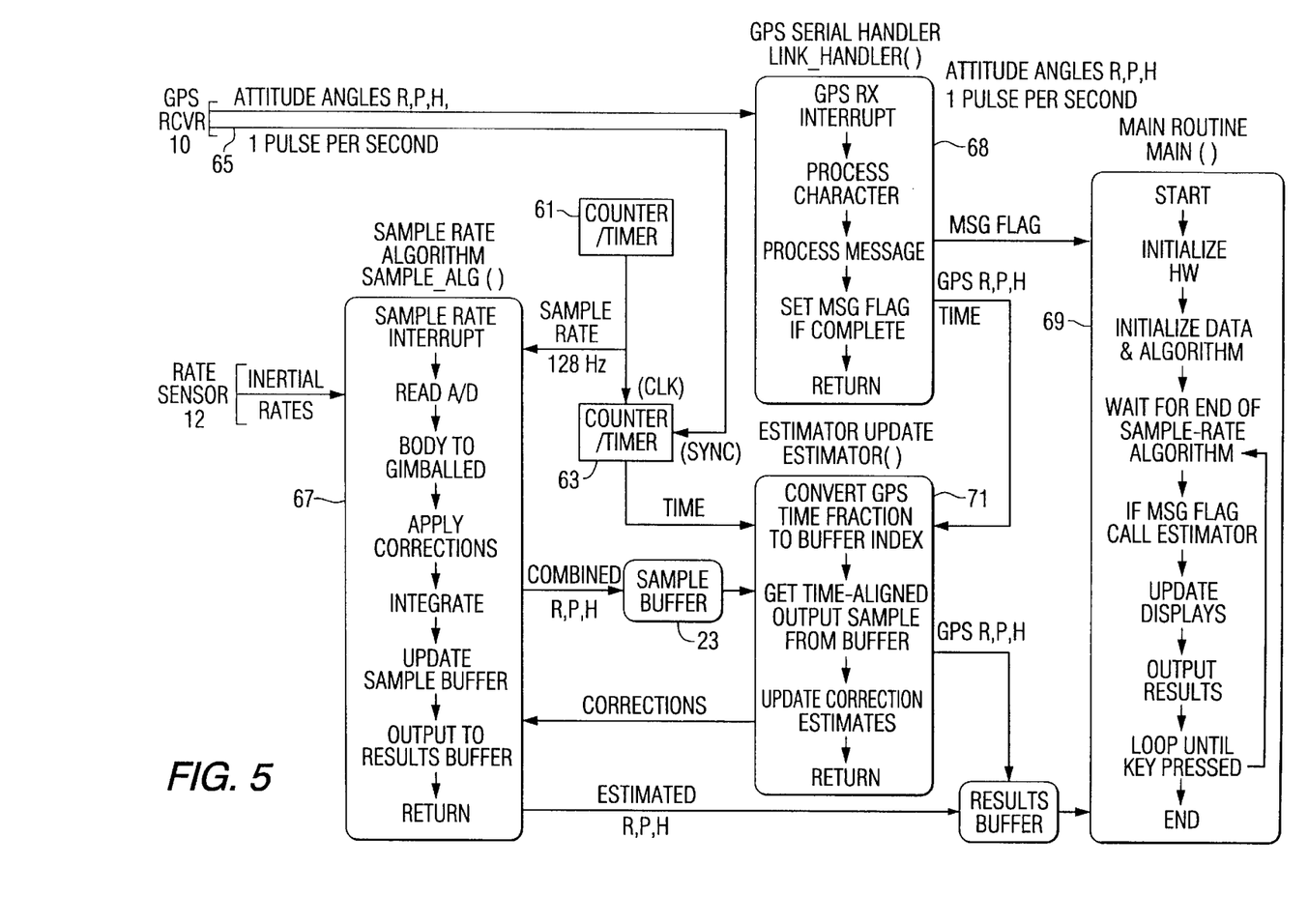
FIG. 5 shows a flow diagram for executing the signal processing operations of the hybrid system of FIG. 4.

FIG. 5 shows a flow diagram for executing the signal processing operations of the hybrid system of FIG. 4. Associated with the sample buffer 23 is a counter/timer 61, which is operative to divide a high speed clock (e.g., 4 Mhz) down to a reduced frequency (e.g., 128 Hz), to provide a 128 Hz sampling signal to a counter/timer 63, and as a sample rate-based interrupt to the digital signal processing routine 67 which executes various signal processing functions of FIG. 4. The one pulse per second signal from the GPS receiver 10 on line 65 is coupled to counter/timer 63, so as to synchronize this counter to the GPS time each second, thereby providing a stable GPS time reference in units of one sample period. Counter/timer 63 provides the exact time fraction within each second, in terms of GPS receiver time. This effectively solves the above-discussed problems of the GPS time tags, and of determining the variable, irregular staleness of the data. It is also possible to synchronize each of the counter/timer channels to the one pulse per second signal.

As described above, the signal processing mechanism employed by the hybrid architecture of the present invention is operative to close a sample buffer feedback loop so that stale GPS data may be compared with the processed inertial rate sensor outputs which were valid at the same time. At each update, the output of counter/timer 63 is used as an index to store the new processed data output in the sample buffer 23. Ignoring the integer number of seconds makes the buffer index wrap around in modulo fashion. As a result, each storage entry in the sample buffer 23 contains the most recent algorithm output for a particular time fraction within each GPS second.

When a new GPS receiver output value is produced, the fractional part of the time tag used as an index to look up the corresponding processed output value in sample buffer 23. This selects the processed output value which was valid at the same time as the update output by GPS receive 10. (Since the output data from the GPS receiver 10 is no more than one second old (although samples may be more than one second apart), the fractional part of the time tag always selects the correct time-matched location in the sample buffer 23. The tracking loop is then closed using the difference of these time-matched processed output values and the GPS receiver values.

As listed within the sample rate signal processing routine 67, in response to the 128 Hz timer interrupt from counter/timer 61, inertial rate signals output by inertial sensors 12 and supplied to an analog-to-digital converter are sampled and digitized and then converted to body coordinate-representative digital signals. These body coordinate system converted signals are then subjected to the above-described bias and scale factor corrections and integrated, so as to obtain attitude (roll, pitch and yaw) outputs. The resulting data is stored in sample buffer 23, using the current time fraction from the counter/timer 63 as a timing reference or index.

Using a GPS serial interrupt handler routine 68, in response to a new GPS update output Msg Flag from GPS receiver 10, once initialized, a main routine 69 calls up an estimation processing routine 71. The GPS serial interrupt handler routine 68 responds to the start of a valid message from the GPS receiver 10 and stores subsequent bytes in a message buffer, until it detects a message termination sequence. In the present example, the message format corresponds to that of the above-referenced TANS Vector II GPS attitude sensor. When the message is complete, the message data is stored in the appropriate variables and appropriate message flag Msg Flag is set.

For the rate bias correction, the estimator algorithm routine 71 employed the GPS time tag fraction from the new GPS output data as an index to look up the time-matched algorithm output values. It then calculate differences between the output of GPS receiver 10 and the inertial rate processed outputs, described above in routine 67. These differences, which correspond to errors between the GPS data and the inertial sensor processed signals, are then converted to body coordinates and integrated. In addition, the bias correction is updated.

For the scale factor correction, the estimator routine 71 determines differences between the two most recent GPS outputs (angle data) and the two most recent algorithm outputs. These differences are estimates of the amount that the platform attitude angle has changed since the previous update from the GPS receiver 10. Using a change in angles is used to distinguish scale factor errors from bias and other errors. Because the angle differences are small in terms of radians, it also allows us to use the gimbaled to body rate conversion routine. The estimator routine converts these differences to body coordinates, then compares them to the noise threshold, reference above. If the differences exceed the maximum GPS receiver noise value, the difference in their absolute values is derived (corresponding to scale factor difference operator 51 in FIG. 4). This difference is an estimate of the inertial rate sensor scale factor error. Via integration operator 53, the estimator algorithm 71 integrates this error over a long time scale to update the scale factor correction.

As will be appreciated from the foregoing description, the previously mentioned shortcomings of conventional instrument stabilizing devices, such as laser ring gyros, flux-gate magnetic compass systems, inertial rate sensor systems, GPS systems, etc., are obviated by the hybrid system of the present invention, in which the rate output signals generated by a plurality of (roll, pitch and yaw) inertial rate sensors are adjusted by means of a buffered position data feedback loop, which uses periodic updates from a global positioning system (GPS) receiver, whose precision platform attitude output is updated periodically, but at a rate that is less than the rate of change of attitude of the platform, as tracked by the inertial rate sensors. This sample buffer feedback loop enables the present invention to prevent a staleness problem with data provided by the GPS receiver, which may be up to a second old, particularly where a typical dynamic platform, such as a ship, may rotate through an angle of multiple beamwidths in one second, preventing effective tracking with only the relatively slow outputs of the GPS receiver.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A system for stably positioning the attitude of an instrument relative to a platform upon which the instrument is mounted, said platform having an orientation that is subject to dynamic variations, comprising:

a platform orientation sensor coupled to said platform and being operative to generate a first signal representative of the orientation of said platform;

at least one angular rate sensor coupled to said platform and being operative to generate a second signal representative of a rate of change of orientation of said platform; and a signal processor which is operative to adjust said second signal in accordance with said first signal.

2. A system according to claim 1, further including an instrument positioning control mechanism which is operative to control the orientation of said instrument relative to said platform in accordance with said adjusted second signals.

3. A system according to claim 2, wherein said platform orientation sensor comprises a global positioning system (GPS) platform orientation sensor, which periodically generates said first signal at a rate less than that of said second signal, and wherein said signal processor is operative to generate a third signal representative of said orientation of said platform based upon said second signal, and to compare first signals with third signals to derive error signals for adjusting said second signal.

4. A system according to claim 1, wherein said signal processor includes a coordinate system conversion mechanism which is operative to cause said second signals output by said GPS receiver and said second signals to be defined in terms of a common coordinate system.

5. A method of stably positioning an instrument relative to a platform upon which the instrument is mounted, said platform having an orientation subject to dynamic variations, comprising the steps of:

(a) coupled to said platform an inertial angular rate sensor that is operative to generate first signals representative of a rate of change of orientation of said platform;

(b) providing a global positioning system (GPS) receiver which is operative to generate second signals representative of orientation of said platform; and (c) adjusting said first signals in accordance with said second signals.

6. A method according to claim 5, wherein step (c) further includes performing a coordinate system conversion operation so as to cause said second signals output by said GPS receiver and said first signals generated by said at least one inertial rate sensor to be defined in terms of a common coordinate system.

7. A method of stably orienting an instrument relative to a platform upon which the instrument is mounted, said platform having an orientation that is subject to dynamic variations, comprising the steps of:

(a) attaching to said platform a plurality of angular rate sensors that are operative to provide first, real-time signals representative of rate of change of a respectively different orientation parameter of said platform;

(b) providing a platform orientation sensor which is operative to generate second signals representative of respectively different orientation parameters of said platform;

(c) adjusting said first signals in accordance with said second signals; and (d) controlling the orientation of said instrument relative to said platform in accordance with said adjusted first signals.

8. A method according to claim 7, wherein said platform orientation sensor is operative to measure the orientation of said platform relative to gravity and geographic north, and wherein said second signals are representative of respectively different instrument gimbal angles of said platform.

9. A method according to claim 7, wherein said platform orientation sensor comprises a global position system (GPS) receiver.

10. A method according to claim 9, wherein said angular rate sensors are operative to generate said first signals representative of rate of roll, pitch and yaw of said platform at a rate sufficient to provide effectively real time tracking of changes in orientation of said platform, and wherein said second signals generated by said GPS receiver are representative of roll, pitch and yaw orientations of said platform and are updated periodically at a rate less than the rate of change of attitude of the platform.

* * * * *